United States Patent
Song et al.

(10) Patent No.: US 11,447,145 B2
(45) Date of Patent: Sep. 20, 2022

(54) ABNORMAL DATA COLLECTING METHOD, APPARATUS, STORAGE MEDIUM AND PRODUCT FOR AUTOMATIC PARKING

(71) Applicant: BEIJING BAIDU NETCOM SCIENCE TECHNOLOGY CO., LTD., Beijing (CN)

(72) Inventors: Jia Song, Beijing (CN); Houqiang Zhu, Beijing (CN); Pengfei Wei, Beijing (CN); Guiguan Bi, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 0 days.

(21) Appl. No.: 17/337,749

(22) Filed: Jun. 3, 2021

(65) Prior Publication Data
US 2021/0284181 A1    Sep. 16, 2021

(30) Foreign Application Priority Data

Dec. 18, 2020    (CN) .......................... 202011502773.1

(51) Int. Cl.
*B60W 50/02* (2012.01)
*B60W 30/06* (2006.01)
*B60W 50/00* (2006.01)

(52) U.S. Cl.
CPC ........ *B60W 50/0225* (2013.01); *B60W 30/06* (2013.01); *B60W 50/0205* (2013.01);
(Continued)

(58) Field of Classification Search
CPC ............. B60W 50/0225; B60W 30/06; B60W 50/0205; B60W 2050/0005; B60W 2050/009; B60W 2050/021
See application file for complete search history.

(56) References Cited

U.S. PATENT DOCUMENTS

2015/0348339 A1* 12/2015 Ohno ................... G07C 5/008
                                                           701/32.7
2016/0210795 A1    7/2016 Shin et al.
(Continued)

FOREIGN PATENT DOCUMENTS

CN        110232752 A     9/2019
CN        111149141 A     5/2020
(Continued)

OTHER PUBLICATIONS

European Search Report in EP Patent Application No. 21176206.7 dated Oct. 27, 2021.
(Continued)

*Primary Examiner* — Peter D Nolan
*Assistant Examiner* — Wae L Louie
(74) *Attorney, Agent, or Firm* — Dilworth IP, LLC

(57) ABSTRACT

The present application discloses an abnormal data collecting method for automatic parking, an apparatus, a storage medium and a product, and relates to automatic driving technology and automatic parking technology in computer technology. A specific implementation i: in response to monitoring that a target vehicle generates a fault code during an automatic parking process, matching the fault code with at least one pre-configured fault code to be collected; in response to determining that the fault code matches the fault code to be collected, determining a data collecting strategy corresponding to the fault code to be collected; and performing a data collecting operation on abnormal data corresponding to the fault code according to the data collecting strategy.

16 Claims, 5 Drawing Sheets

(52) U.S. Cl.
CPC ............ *B60W 2050/0005* (2013.01); *B60W 2050/009* (2013.01); *B60W 2050/021* (2013.01)

(56) References Cited

U.S. PATENT DOCUMENTS

| | | | |
|---|---|---|---|
| 2017/0352261 A1 | 12/2017 | Hasegawa | |
| 2018/0170349 A1* | 6/2018 | Jobson | ................... B60L 7/18 |
| 2019/0377341 A1 | 12/2019 | Choi | |
| 2019/0394230 A1* | 12/2019 | Park | ................... H04L 45/302 |
| 2020/0001774 A1* | 1/2020 | Kim | ................... G05D 1/0088 |
| 2020/0317188 A1* | 10/2020 | Lai | ................... G06V 20/58 |

FOREIGN PATENT DOCUMENTS

| | | |
|---|---|---|
| CN | 111845721 A | 10/2020 |
| CN | 112037564 A | 12/2020 |

OTHER PUBLICATIONS

First Office Action in EP Patent Application No. 21176206.7 dated Jul. 13, 2022.

\* cited by examiner

ABNORMAL DATA COLLECTING METHOD, APPARATUS, STORAGE MEDIUM AND PRODUCT FOR AUTOMATIC PARKING

CROSS-REFERENCE TO RELATED APPLICATIONS

This application claims priority to Chinese Patent Application No. 2020/1502773.1, filed on Dec. 18, 2020 and entitled "ABNORMAL DATA COLLECTING METHOD, APPARATUS, STORAGE MEDIUM AND PRODUCT FOR AUTOMATIC PARKING", which is hereby incorporated by reference in its entirety.

TECHNICAL FIELD

The present application relates to automatic driving technology and automatic parking technology in computer technology, and in particular to an abnormal data collecting method for automatic parking, an apparatus, a storage medium and a product.

BACKGROUND

Automatic parking is the first published function of automatic driving technology on the mass-produced vehicle models that has been implemented by many automakers, and it is the entry point for unmanned driving capabilities which is truly consumer-oriented. In order to realize the analysis and optimization for the automatic parking function, it is necessary to obtain a large amount of data in fault scenarios.

Existing methods for acquiring fault data are generally to acquire data during the production and testing stages of autonomous vehicles, or, when a fault is detected during use by the user, the user reports the fault information by himself.

SUMMARY

The present application provides an abnormal data collecting method, an apparatus, a storage medium and a product for automatic parking.

According to a first aspect, an abnormal data collecting method for automatic parking is provided, comprising:

in response to monitoring that a target vehicle generates a fault code during an automatic parking process, matching the fault code with at least one pre-configured fault code to be collected;

in response to determining that the fault code matches the fault code to be collected, determining a data collecting strategy corresponding to the fault code to be collected; and performing a data collecting operation on abnormal data corresponding to the fault code according to the data collecting strategy.

According to a second aspect, an abnormal data collecting apparatus for automatic parking is provided, comprising:

a matching module, configured to, in response to monitoring that a target vehicle generates a fault code during an automatic parking process, match the fault code with at least one pre-configured fault code to be collected;

a determining module, configured to, in response to determining that the fault code matches the fault code to be collected, determine a data collecting strategy corresponding to the fault code to be collected; and a collecting module, configured to perform a data collecting operation on abnormal data corresponding to the fault code according to the data collecting strategy.

According to a third aspect, an electronic device is provided, comprising:

at least one processor; and a memory communicatively connected to the at least one processor; where, the memory stores instructions executable by the at least one processor, and the instructions are executed by the at least one processor to enable the at least one processor to execute the abnormal data collecting method for automatic parking according to the first aspect.

According to a fourth aspect, a non-transitory computer-readable storage medium is provided, having computer instructions stored thereon, where the computer instructions are used to cause a computer to execute the abnormal data collecting method for automatic parking according to the first aspect.

According to a fifth aspect, a computer program product, where the computer product comprises a computer program stored in a readable storage medium, at least one processor of an electronic device can read the computer program from the readable storage medium, and the at least one processor executes the computer program to enable the electronic device to execute the method according to the first aspect.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF DRAWINGS

The drawings are used to better understand the solutions, and do not constitute a limitation on the present application, where.

DESCRIPTION OF EMBODIMENTS

Figure 1:
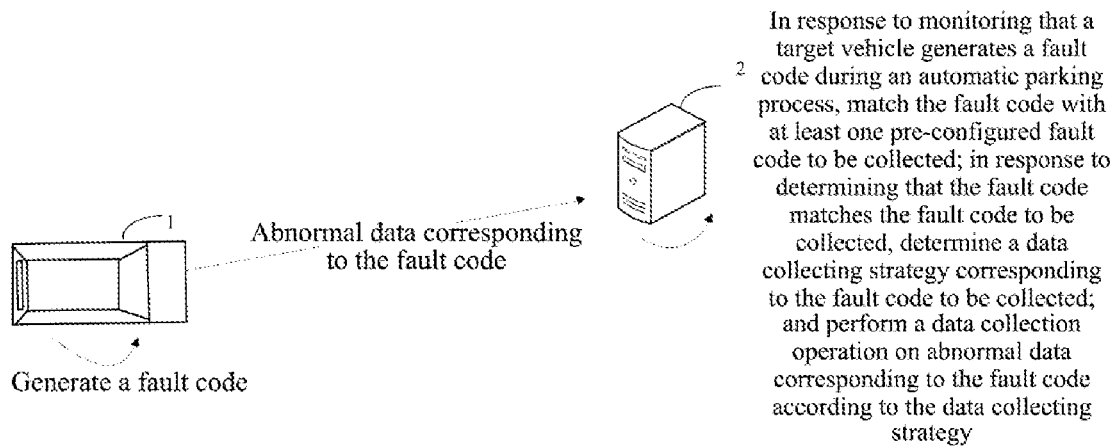
FIG. 1 is a schematic diagram of a system architecture on which the present disclosure is based.

Exemplary embodiments of the present application are described below with reference to the accompanying drawings, where various details of the embodiments of the present application are included to facilitate understanding, and should be considered as merely exemplary. Therefore, those of ordinary skill in the art should recognize that various changes and modifications can be made to the embodiments described herein without departing from the scope and spirit of the present application. Similarly, for clarity and conciseness, descriptions of well-known functions and structures are omitted in the following description.

Mass-produced autonomous vehicles do not have environment conditions for laboratory test, and since using areas and scopes of users are all over the country, it is difficult for engineers to conduct comprehensive and systematic orientational collection of vehicle failure data. The information that users remotely feedback through online channels is mostly indirect data, and does not have first-hand information related to abnormal function, which is used for problem diagnosis and function improvement with low reference, and cannot be used for optimization of automatic driving models.

With respect to the abovementioned problem that the existing abnormal data collecting method for automatic parking is extremely limited for data collection and feedback methods when the automatic parking function is abnormal, which is not conducive to the real-time diagnosis processing of the automatic parking function fault, and is difficult to provide help for updating the corresponding automatic parking function, the disclosure provides an abnormal data collecting method for automatic parking, an apparatus, a storage medium and a product.

It should be noted that the abnormal data collecting method for automatic parking, apparatus, storage medium, and product provided in the present disclosure can be used in various scenarios of abnormal data collection for automatic parking.

As an emerging technology in the field of unmanned driving, automatic parking may be used abnormally in the early application stage. In order to solve and optimize the abnormality, it is necessary to analyze scenario information of the abnormal occurrence to locate the root cause of the problem and establish a systemic or operational avoidance mechanism. The acquisition of fault scenario information data becomes a prerequisite for problem diagnosis. On the one hand, the abnormality of the automatic parking function comes from the system itself, that is, when the system runs for a long time or faces the input of complex external information, the logic of the code level can easily trigger errors such as memory resource overrun, CPU resource overrun, and timestamp abnormality; on the other hand, it comes from the abnormal operating condition of the function, that is, when the external conditions of a car do not meet the ODD (Operation Design Domain) conditions of the automatic parking function, or there are differences between the actual scenario and the function design, status errors are likely to occur; at the same time, improper operation of the user may also cause function abnormality.

In order to realize abnormal data collection in the automatic parking abnormal scenarios, on one hand, the existing technology is carried out in the production and testing phases on the one hand, through the abnormal content exposed in the testing process of software in the loop and hardware in the loop, engineers pass the diagnosis. The instrument is directly connected to the vehicle to collect the corresponding fault information. On the other hand, during the user use, when the user finds that the automatic parking function is abnormal, he can actively report the abnormal information. However, mass-produced autonomous vehicles do not have environment conditions for laboratory test, and since using areas and scopes of users are all over the country, it is difficult for engineers to conduct comprehensive and systematic orientational collection of vehicle failure data. The data uploaded autonomously by users is often used for problem diagnosis and function improvement with low reference, and cannot be used for optimization of automatic driving models.

In the process of solving the above technical problems, the inventor found through research that in order to acquire high-quality abnormal data, the collecting strategy and fault codes of all abnormal events that need to be collected can be preset. Abnormal events in the automatic parking process are monitored, and when it is detected that a fault code generated during the automatic parking process matches a preset fault code of the abnormal event that needs to be collected, the collecting strategy corresponding to the preset fault code can be used to collect abnormal data. Thereby, the effect of automatically triggering the collection of various abnormal data under the automatic parking function can be realized without interference and burden on the user, which greatly improves the efficiency of data collection.

Therefore, the technology according to the present application solves the problem that the existing abnormal data collecting method for automatic parking is extremely limited for data collection and feedback methods when the automatic parking function is abnormal, which is not conducive to the real-time diagnosis processing of the automatic parking function fault, and is difficult to provide help for updating the corresponding automatic parking function.

FIG. 1 is a schematic diagram of a system architecture on which the present disclosure is based. As shown in FIG. 1, the system architecture on which the present disclosure is based at least includes: a target vehicle 1 with an automatic parking function and a server 2, where the server 2 is set with to an abnormal data collecting apparatus for automatic parking that can be written in the language such as C/C++, Java, Shell, or Python. The target vehicle 1 and the server 2 can be communicatively connected, so that the two can perform information interaction.

The present application involves automatic driving technology and automatic parking technology in computer technology to achieve the effect of automatically triggering the collection of various abnormal data under the automatic parking function, which not only ensures the effective collection and upload of high-value abnormal data, but also does not cause interference and burden to users, which greatly improves the efficiency of data collection.

Figure 2:
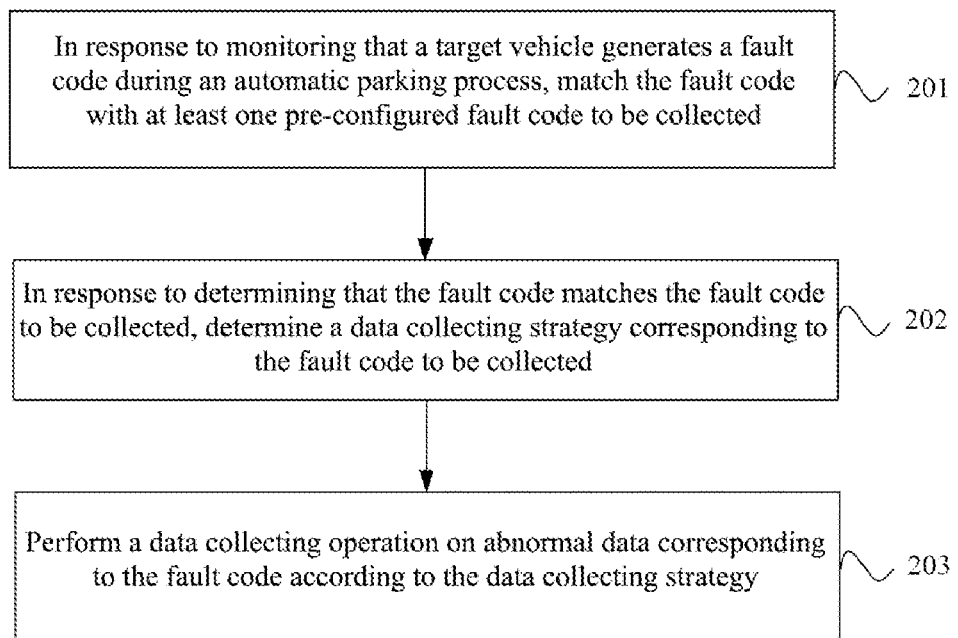
FIG. 2 is a schematic flowchart of an abnormal data collecting method for automatic parking according to a first embodiment of the present disclosure.

FIG. 2 is a schematic flowchart of an abnormal data collecting method for automatic parking according to a first embodiment of the present disclosure. As is shown in FIG. 2, the method includes:

Step 201: in response to monitoring that a target vehicle generates a fault code during an automatic parking process, match the fault code with at least one pre-configured fault code to be collected.

An execution subject of this embodiment is an abnormal data collecting apparatus for automatic parking. The abnormal data collecting apparatus for automatic parking can be coupled to a server, which can also be a server independent of the target vehicle, and also can be a server installed in the target vehicle.

In order to realize the collection of abnormal data corresponding to automatic parking function, types of all the abnormal data that needs to be collected can be determined first. Specifically, abnormality types that may occur in the automatic parking function can be specifically divided into three categories: system abnormality type, abnormal operating type, and driver operation abnormal type.

1. The system abnormality type can specifically include software and hardware failures under the automatic parking function detected by a car-end failure monitoring system.

Hardware abnormalities include abnormal states of a vehicle, an electronic control unit (ECU), and a sensor; software abnormalities include: abnormal states of various function modules and a system operating environment. Such abnormalities are usually caused by a system fault, and each of the abnormalities can correspond to a fault code of an abnormal item in a safety fault list of the vehicle system.

2. The abnormal operating type can specifically include abnormal function execution due to the external environment when the system is normal. Such abnormalities vary according to the automatic parking function, but are mainly divided into three categories: training abnormality, starting condition abnormality, and executing abnormality.

2.1. The training abnormality is mainly caused by reasons, such as the external environment beyond the learning range, the vehicle state dissatisfying learning requirements, and the vehicle sensor being blocked, during the stage when a user helps the vehicle to establish the automatic parking function. For example, the external environment where the vehicle is located is dark and crowded, etc., which may not be able to satisfy the learning requirements.

2.2. The starting condition abnormality is usually generated when the automatic parking function is activated, mainly caused by reasons, such as global position system (GPS) positioning deviation, inconsistent use and learning conditions, etc.

2.3. The executing abnormality generally occurs when the vehicle automatically performs the parking function, which is mainly caused by the external environment, such as interference by obstacles and no empty parking space, etc., which does not satisfy executing requirements.

3. The driver operation abnormal type refers to the situation where the automatic parking is interrupted or stopped due to the driver's active execution of the operation when the system is normal and the operating state is normal. It usually includes three categories: a user taking over the vehicle, a user canceling parking, and user violation operation.

3.1. The user taking over the vehicle generally includes a driver taking over the steering wheel, switching gears, pressing an accelerator pedal, pressing a brake pedal, etc., which mainly occurs when the user believes that the automatic parking state does not meet expectations and takes intervention measures to correct or strengthen automatic driving behavior. Under this state, the automatic parking can still continue, but its occurrence means that the automatic driving model has a result that does not meet expectations of human being.

3.2 The user cancelling parking is manifested as the driver's operation through a button at the car-end or a remote mobile phone software to completely terminate automatic parking this time. It mainly occurs when the user believes that the automatic parking function cannot meet the current needs, or due to human factors, it is necessary to completely switch to manual driving. Under this state, the automatic parking function ends, and its occurrence means that the automatic driving model cannot satisfy the parking needs of the environment at that time.

3.3. The user violation operation usually caused by improper operation by the driver, such as a behavior that opening a door during automatic parking, a main driver loosening the seat belt halfway, opening a fuel tank cap during driving, etc., which affects normal driving. The occurrence of this state means that the automatic driving model is severely disturbed and does not satisfy the condition of the automatic parking function.

In this embodiment, for each of the above-mentioned abnormality types, the fault code corresponding to the type is set. During operating of the target vehicle, the hardware device and function modules set in the target vehicle can compare the data generated in real-time with the preset correct data, and automatically determine whether a fault has occurred. When a fault is detected, the fault code corresponding to the fault is generated.

Correspondingly, in order to realize the collection of high-quality abnormal data, the abnormal data collecting apparatus for automatic parking can monitor the fault code generated by the target vehicle to determine whether the fault code generated by the target vehicle matches with the at least one preset fault code to be collected.

Optionally, the abnormal data collecting apparatus for automatic parking can perform a monitoring operation and a comparing operation on the fault code generated by the target vehicle in real time, or perform the monitoring operation and the comparing operation on the fault code generated by the target vehicle at a preset interval, which is not limited in the present disclosure.

Step 202: in response to determining that the fault code matches the fault code to be collected, determine a data collecting strategy corresponding to the fault code to be collected.

In this embodiment, in the process of collecting abnormal data, different abnormality types require collecting different data. Therefore, in order to achieve accurate collection of abnormal data, for each fault code to be collected, a data collecting strategy corresponding to the fault code to be collected can be set.

Correspondingly, when it is detected that the fault code generated by the target vehicle matches any fault code to be collected, the data collecting strategy corresponding to the fault code to be collected can be determined.

Step 203: perform a data collecting operation on abnormal data corresponding to the fault code according to the data collecting strategy.

In this embodiment, after the data collecting strategy corresponding to the fault code to be collected is obtained, the abnormal data corresponding to the fault code can be collected according to the data collecting strategy.

The abnormal data collecting method for automatic parking provided in this embodiment monitors the abnormal event during the automatic parking process, and when it is detected that the fault code generated during the automatic parking process matches the preset fault code of the abnormal event that needs to be collected, the collecting strategy corresponding to the preset fault code can be used to collect the abnormal data. Therefore, the effect of automatically triggering the collection of various abnormal data under the automatic parking function can be realized without interference and burden on the user, which greatly improves the efficiency of data collection. In addition, by presetting the data collecting strategy corresponding to the fault code, accurate collection of the effective abnormal data corresponding to the fault code can be realized, which improves the quality of the collected abnormal data.

Further, on the basis of the first embodiment, the data collecting strategy may specifically include a data type, a data format, and a collection duration of abnormal data to be collected;

Correspondingly, step 203 specifically includes:

collect all target data that matches the collection duration among data corresponding to the fault code; and acquire data matching the data type and the data format of the abnormal data to be collected among all the target data as the abnormal data corresponding to the fault code.

In this embodiment, the data collecting strategy specifically includes the data type, the data format, and the collection duration of the abnormal data to be collected. Therefore, after the data collecting strategy corresponding to the fault code is obtained, all target data matching the collection duration among the data corresponding to the fault code can be collected according to the data collecting strategy. Data matching the data type and the data format of the abnormal data to be collected among all the target data are collected as the abnormal data corresponding to the fault code.

It should be noted that the execution sequence of the above two steps can be switched according to the actual situation, which is not limited in the present disclosure. For example, all the target data can be collected in advance according to the data type and the data format of the abnormal data to be collected, and data matching the collection duration among all the target data can be collected as the abnormal data.

By collecting abnormal data according to the data collecting strategy, accurate collection of effective abnormal data corresponding to the fault code can be realized, which improves the quality of the collected abnormal data.

Further, on the basis of the first embodiment, the collection duration covers a preset duration before and after occurrence of the fault code; the collect all target data that matches the collection duration among data corresponding to the fault code comprises:

acquire first target data within the preset duration before the occurrence of the fault code from a preset memory loop tool of the target vehicle;

acquire second target data written into the memory loop tool in real time by the target vehicle within the preset duration after the occurrence of the fault code; and use the first target data and the second target data as all the target data.

In this embodiment, the memory loop tool is provided in the target vehicle. During the operating of the automatic parking function, a data source in the target vehicle can write data generated in real time into the memory loop tool for storage. The memory loop tool can store the data generated by the data source for a preset period of time. When the preset period is exceeded and the corresponding fault code is still not generated, in order to save memory, the above data can be deleted at this time.

Specifically, the collection duration covers the preset duration before and after the occurrence of the fault code. Therefore, the first target data within the preset duration before the occurrence of the fault code can be acquired from the preset memory loop tool of the target vehicle. The second target data written to the memory loop tool in real time by the target vehicle within the preset duration after the occurrence of the fault code is acquired. The first target data and the second target data are used as all the target data.

Figure 3:
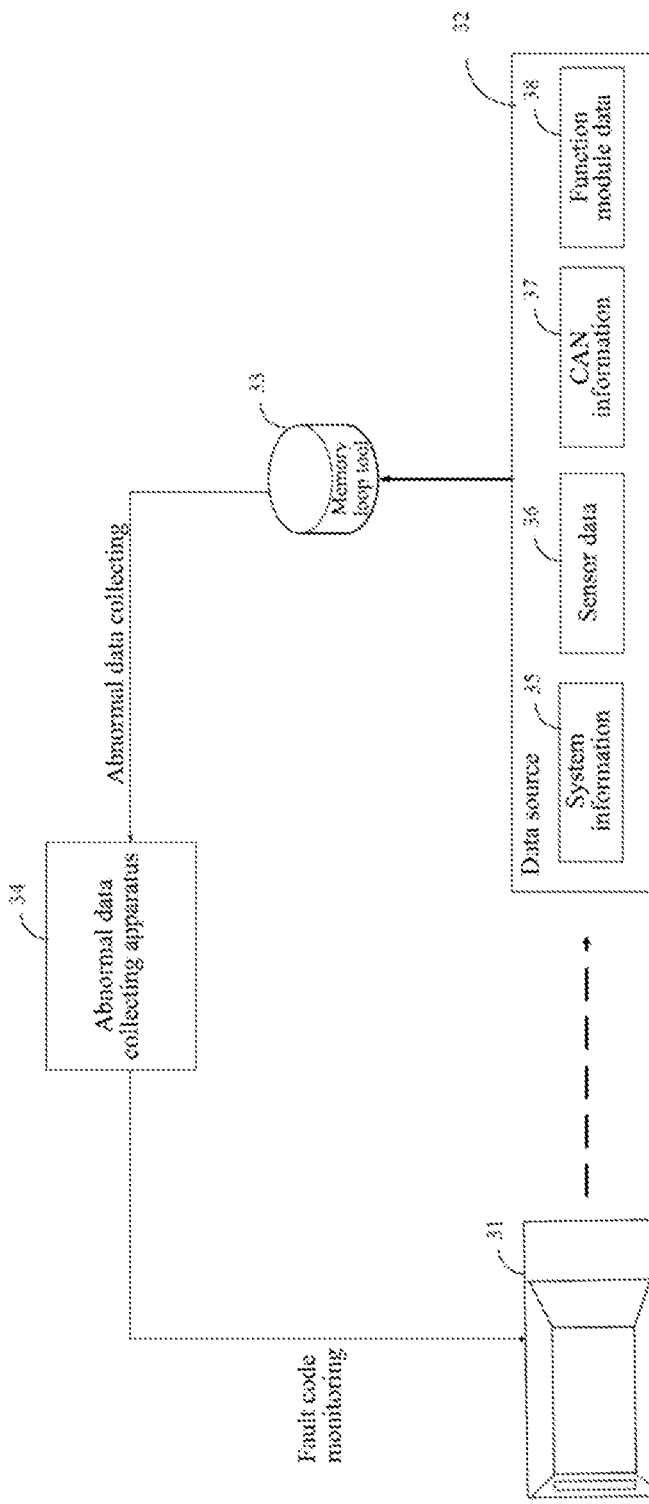
FIG. 3 is a schematic diagram of an application scenario according to an embodiment of the present disclosure.

FIG. 3 is a schematic diagram of an application scenario according to an embodiment of the present disclosure. As shown in FIG. 3, in the application scenario, there at least includes a target vehicle 31, a data source 32, a memory loop tool 33, and an abnormal data collecting apparatus 34 for automatic parking. In this application scenario, the data source 32 set in the target vehicle 31 can send the generated data to the memory loop tool 33 in real time for storage. The memory loop tool 33 can acquire data sent by the data source 32 in real time for storage, and clean up the data stored for a time exceeding a preset duration. The data source 32 includes, but is not limited to, system information 35, sensor data 36, controller area network (CAN) information 37, and function module data 38.

The abnormal data collecting apparatus 34 for automatic parking can monitor the fault code generated by the target vehicle 31 during the automatic parking process. When it is detected that the fault code matches a preset fault code to be collected, a data collecting strategy corresponding to the fault code to be collected is determined. The abnormal data corresponding to the fault code is obtained from the memory loop tool 33 for data collecting operation according to the data collecting strategy.

By acquiring abnormal data covering the preset duration before and after the occurrence of the fault code, it is possible to ensure that the collected abnormal data can completely record the whole process of abnormal triggering. On the one hand, it can be played back in detail frame by frame to diagnose the cause of the abnormality; on the other hand, an automatic parking model after algorithm optimization can be placed in the same scenario again to determine whether a new version of the model can correctly handle the problem scenario that an old version of the model cannot handle.

Figure 4:
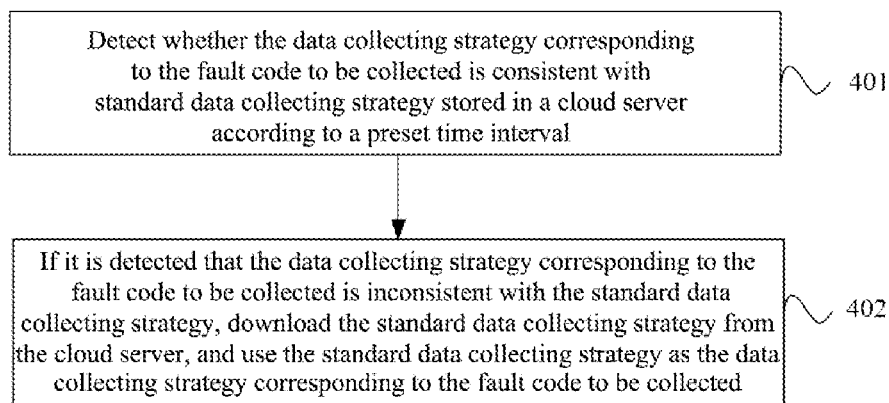
FIG. 4 is a schematic flowchart of an abnormal data collecting method for automatic parking according to a second embodiment of the present disclosure.

FIG. 4 is a schematic flowchart of an abnormal data collecting method for automatic parking according to a second embodiment of the present disclosure. On the basis of the first embodiment, before step 202, the method further includes:

step 401: detect whether the data collecting strategy corresponding to the fault code to be collected is consistent with standard data collecting strategy stored in a cloud server according to a preset time interval; and step 402: if it is detected that the data collecting strategy corresponding to the fault code to be collected is inconsistent with the standard data collecting strategy, download the standard data collecting strategy from the cloud server, and use the standard data collecting strategy as the data collecting strategy corresponding to the fault code to be collected.

In this embodiment, the data collecting strategy can be defined on demand, a specified data indicator, frame rate and duration can be flexibly configured according to the needs of research personnel for staged function debugging and technical optimization, the first-hand data collected is large, diverse, and strong pertinent, which improves marginal revenue of data collection per unit period. After the research personnel complete the update of the data collecting strategy, the updated data collecting strategy can be uploaded to the cloud server for storage.

Correspondingly, the abnormal data collecting apparatus for automatic parking can detect whether the data collecting strategy corresponding to the currently used fault code to be collected is consistent with the standard data collecting strategy stored in the cloud server according to a preset time interval. If they are consistent, it means that the currently used data collecting strategy is the latest data collecting strategy. Otherwise, it is needed to update the currently used data collecting strategy. Specifically, if it is detected that the data collecting strategy corresponding to the fault code to be collected is inconsistent with the standard data collecting strategy, the standard data collecting strategy is downloaded from the cloud server, and the standard data collecting strategy is used as the data collecting strategy corresponding to the fault code to be collected.

Specifically, over-the-air (OTA) can be used to download the standard data collecting strategy from the cloud server.

It is also possible to use any other method to download the standard data collecting strategy, which is not limited in the present disclosure.

Figure 5:
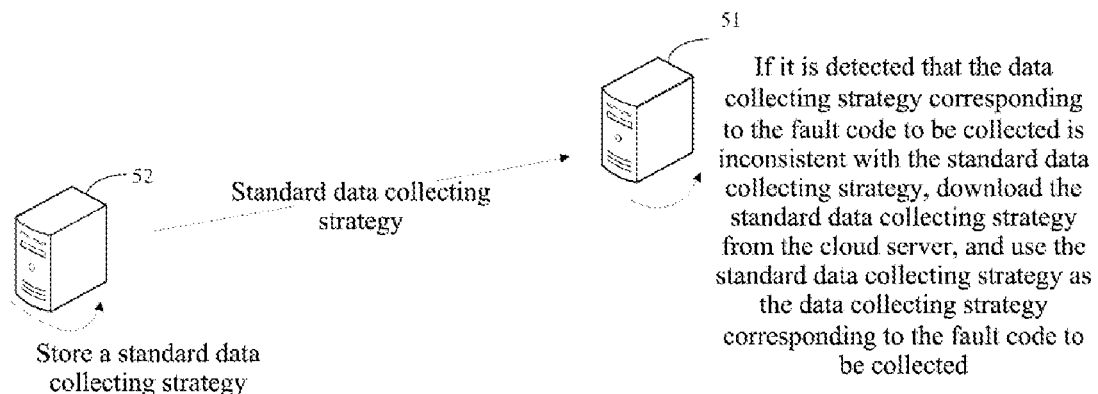
FIG. 5 is a schematic diagram of another system on which the present disclosure is based.

FIG. 5 is a schematic diagram of another system on which the present disclosure is based. As shown in FIG. 5, a system architecture on which the present disclosure is based may specifically include a server 51 and a cloud server 52, where the abnormal data collecting apparatus for automatic parking may be coupled to the server 51. The server 51 and the cloud server 52 may be communicatively connected.

The abnormal data collecting method for automatic parking provided in this embodiment updates the currently used data collecting strategy according to the standard data collecting strategy stored in the cloud server when it is detected that the data collecting strategy corresponding to the fault code to be collected is inconsistent with the standard data collecting strategy, so that the abnormal data collected according to the data collecting strategy has a large amount of first-hand data, a variety of types, and a strong pertinence, which provides a basis for subsequent optimization of automatic parking function.

Further, based on any of the foregoing embodiments, the data collecting strategy further includes priority information corresponding to each data type; after step 203, the method further includes:

perform a storing operation on the abnormal data according to the priority information corresponding to each data type.

In this embodiment, data of different data types among the abnormal data corresponding to the fault code may have different priorities. Therefore, different storage methods can be adopted for abnormal data of different data types according to the priority.

By adopting different storage methods for abnormal data of different data types according to the priority, diversified processing for the abnormal data can be realized.

Further, based on any of the foregoing embodiments, the perform a storing operation on the abnormal data according to the priority information corresponding to each data type includes:

if a data type priority of the abnormal data is higher than a preset priority threshold, upload the abnormal data to a cloud server for storage; and if the data type priority of the abnormal data is lower than the preset priority threshold, perform a data compression operation on the abnormal data, and adding the compressed abnormal data to a cache queue for storage.

In this embodiment, if the data type priority of the abnormal data is higher than the preset priority threshold, it means that importance of the abnormal data is higher, and the abnormal data needs to be uploaded to the cloud server as soon as possible for subsequent function optimization, problem analysis and other purposes.

Conversely, if the data type priority of the abnormal data is lower than the preset priority threshold, it means that the importance of the abnormal data is not high, and the abnormal data can be compressed, and the compressed abnormal data can be added to the cache queue for storage. An H265 encoder can be specifically used to implement the compressing operation on the abnormal data.

Data with higher priority is first transmitted to the cloud server for storage, and data with lower priority is added to the cache queue for storage according to the priority, so that important data can be collected as soon as possible for providing a basis for subsequent function optimization and problem analysis.

Further, based on any of the foregoing embodiments, the upload the abnormal data to a cloud server for storage includes:

upload the abnormal data to the cloud server for storage by breakpoint resumption.

In this embodiment, the abnormal data can be uploaded to the cloud server for storage by breakpoint resumption. When the network condition is not good, the data will be sub-packaged to avoid loss during data transmission. When the network is completely disconnected, the data will be cached in the embedded multi media card (eMMC) for power-down protection.

The abnormal data collecting method for automatic parking provided by this embodiment uploads the abnormal data to the cloud server for storage by breakpoint resumption, which can improve the efficiency of the abnormal data transmission.

Figure 6:
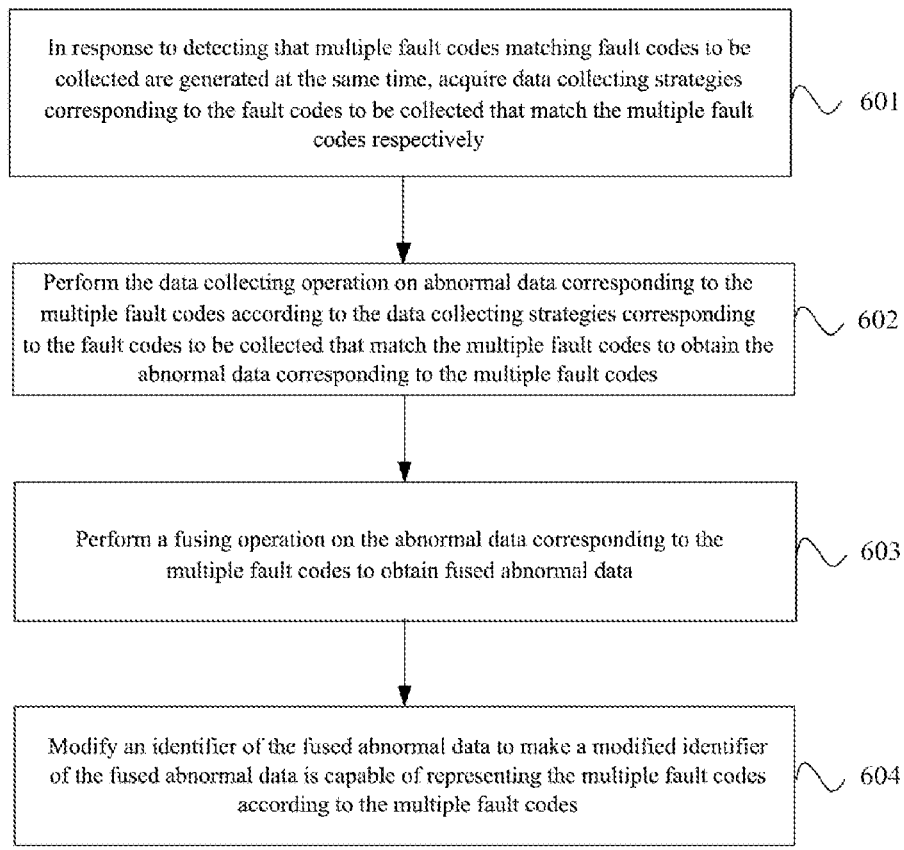
FIG. 6 is a schematic flowchart of an abnormal data collecting method for automatic parking according to a third embodiment of the present disclosure.

FIG. 6 is a schematic flowchart of an abnormal data collecting method for automatic parking according to a third embodiment of the present disclosure. On the basis of any of the above embodiments, after step 202, the method further includes:

step 601: in response to detecting that multiple fault codes matching fault codes to be collected are generated at the same time, acquire data collecting strategies corresponding to the fault codes to be collected that match the multiple fault codes respectively;

step 602: perform the data collecting operation on abnormal data corresponding to the multiple fault codes according to the data collecting strategies corresponding to the fault codes to be collected that match the multiple fault codes to obtain the abnormal data corresponding to the multiple fault codes;

step 603: perform a fusing operation on the abnormal data corresponding to the multiple fault codes to obtain fused abnormal data; and step 604: modify an identifier of the fused abnormal data to make a modified identifier of the fused abnormal data is capable of representing the multiple fault codes according to the multiple fault codes.

In this embodiment, when the multiple fault codes occur at the same time, in order to reduce the amount of uploaded data, the fusing operation can be performed on the abnormal data corresponding to the fault code. Specifically, when it is detected that the multiple fault codes matching the fault codes to be collected are generated at the same time, the data collecting strategies corresponding to the fault codes to be collected that match the multiple fault codes are acquired respectively. The abnormal data collecting operation is performed according to the data collecting strategies corresponding to the fault codes to be collected that match the multiple fault codes to obtain the abnormal data corresponding to the multiple fault codes.

The fusing operation is performed on the abnormal data corresponding to the multiple fault codes to obtain the fused abnormal data. In order to clearly know the abnormal data corresponding to which fault code the fused abnormal data is in the subsequent use process, after performing the fusing operation on the abnormal data corresponding to the multiple fault codes, the identifier corresponding to the fused abnormal data can also be modified, so that the modified identifier of the fused abnormal data is capable of representing the multiple fault codes.

The fusing operation may specifically be a superposition of the abnormal data corresponding to the multiple fault codes.

The abnormal data collecting method for automatic parking provided by this embodiment can perform the fusion processing on the abnormal data corresponding to the fault code to reduce the amount of uploaded data when the multiple fault codes occur at the same time, and modify the identifier corresponding to the fused abnormal data, which can reduce the amount of uploaded data and improve the efficiency of data transmission.

Figure 7:
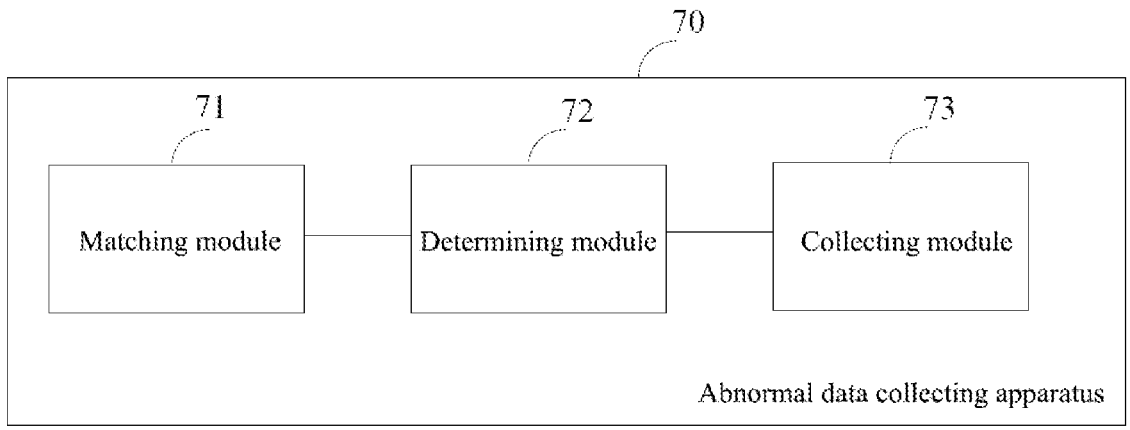
FIG. 7 is a schematic structural diagram of an abnormal data collecting apparatus for automatic parking according to a fourth embodiment of the present disclosure.

FIG. 7 is a schematic structural diagram of an abnormal data collecting apparatus for automatic parking according to a fourth embodiment of the present disclosure. As shown in FIG. 7, the abnormal data collecting apparatus 70 for automatic parking includes a matching module 71, a determining module 72 and a collecting module 73. The matching module 71 is configured to, in response to monitoring that a target vehicle generates a fault code during an automatic parking process, match the fault code with at least one pre-configured fault code to be collected. The determining module 72 is configured to, in response to determining that the fault code matches the fault code to be collected, determine a data collecting strategy corresponding to the fault code to be collected. The collecting module 73 is configured to perform a data collecting operation on abnormal data corresponding to the fault code according to the data collecting strategy.

The abnormal data collecting apparatus for automatic parking provided in this embodiment monitors the abnormal event during the automatic parking process, and when it is detected that the fault code generated during the automatic parking process matches the preset fault code of the abnormal event that needs to be collected, the collecting strategy corresponding to the preset fault code can be used to collect the abnormal data. Therefore, the effect of automatically triggering the collection of various abnormal data under the automatic parking function can be realized without interference and burden on the user, which greatly improves the efficiency of data collection. In addition, by presetting the data collecting strategy corresponding to the fault code, accurate collection of the effective abnormal data corresponding to the fault code can be realized, which improves the quality of the collected abnormal data.

Further, based on the fourth embodiment, the data collecting strategy includes a data type, a data format, and a collection duration of abnormal data to be collected; the collecting module is configured to: collect all target data that matches the collection duration among data corresponding to the fault code; and acquire data matching the data type and the data format of the abnormal data to be collected among all the target data as the abnormal data corresponding to the fault code.

Further, on the basis of the fourth embodiment, the collection duration covers a preset duration before and after occurrence of the fault code; the collecting module is configured to: acquire first target data within the preset duration before the occurrence of the fault code from a preset memory loop tool of the target vehicle; acquire second target data written into the memory loop tool in real time by the target vehicle within the preset duration after the occurrence of the fault code; and use the first target data and the second target data as all the target data.

Further, on the basis of the fourth embodiment, the apparatus further includes: a detection module and a downloading module. The detecting module is configured to detect whether the data collecting strategy corresponding to the fault code to be collected is consistent with standard data collecting strategy stored in a cloud server according to a preset time interval. The downloading module is configured to, if it is detected that the data collecting strategy corresponding to the fault code to be collected is inconsistent with the standard data collecting strategy, download the standard data collecting strategy from the cloud server, and use the standard data collecting strategy as the data collecting strategy corresponding to the fault code to be collected.

Further, on the basis of any one of the above-mentioned embodiments, the data collecting strategy further includes priority information corresponding to each data type; and the apparatus further includes: a storage module, configured to perform a storing operation on the abnormal data according to the priority information corresponding to each data type.

Further, on the basis of any one of the above embodiments, the storage module is configured to: if a data type priority of the abnormal data is higher than a preset priority threshold, upload the abnormal data to a cloud server for storage; and if the data type priority of the abnormal data is lower than the preset priority threshold, perform a data compression operation on the abnormal data, and add the compressed abnormal data to a cache queue for storage.

Further, on the basis of any one of the foregoing embodiments, the storage module is configured to: upload the abnormal data to the cloud server for storage by breakpoint resumption.

Further, on the basis of any one of the foregoing embodiments, the apparatus further includes: an acquiring module, a data collecting module, a fusing module, and an editing module. The acquiring module is configured to, in response to detecting that multiple fault codes matching the fault codes to be collected are generated at the same time, acquire data collecting strategies corresponding to the fault codes to be collected that match the multiple fault codes respectively. The data collecting module is configured to perform the data collecting operation on abnormal data corresponding to the multiple fault codes according to the data collecting strategies corresponding to the fault codes to be collected that match the multiple fault codes to obtain the abnormal data corresponding to the multiple fault codes. The fusing module is configured to perform a fusing operation on the abnormal data corresponding to the multiple fault codes to obtain fused abnormal data. The editing module is configured to modify an identifier of the fused abnormal data to make a modified identifier of the fused abnormal data is capable of representing the multiple fault codes according to the multiple fault codes.

According to embodiments of the present application, the present application also provides an electronic device and a readable storage medium.

According to an embodiment of the present application, the present application also provides a computer program product. The program product includes: a computer program, the computer program is stored in a readable storage medium, at least one processor of the electronic device can read the computer program from the readable storage medium, and the at least one processor executes the computer program to make the electronic device execute the solution provided in any of the foregoing embodiments.

Figure 8:
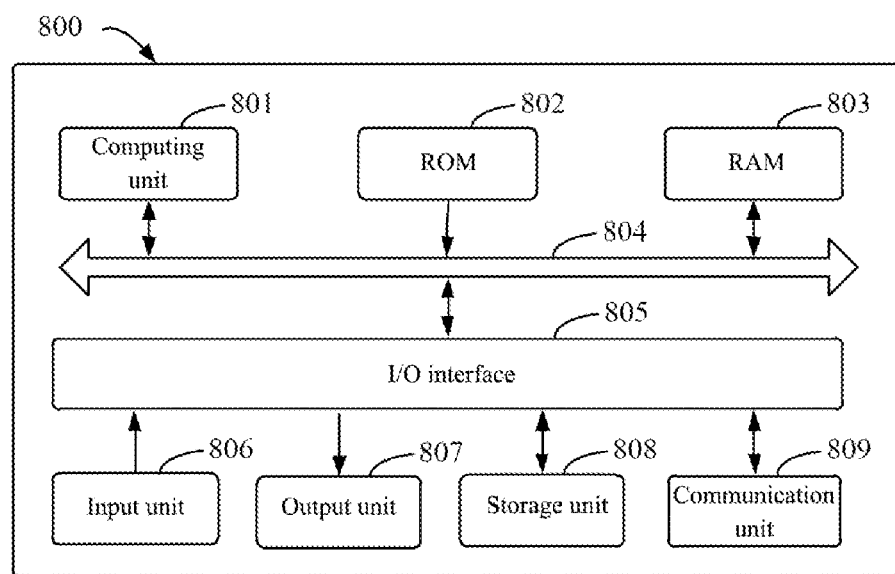
FIG. 8 shows a schematic block diagram of an example electronic device 800 that can be used to implement embodiments of the present application.

FIG. 8 shows a schematic block diagram of an example electronic device 800 that can be used to implement embodiments of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile devices, such as a personal digital processing, a cellular phone, a smart phone, a wearable device, and other similar computing devices. The components shown herein, their connections and relationships, and their functions are merely examples, and are not intended to limit implementations of the present application described and/or claimed herein.

As shown in FIG. 8, the electronic device 800 includes a computing unit 801, which can be based on a computer program stored in a read-only memory (ROM) 802 or load a computer program in a random access memory (RAM) 803 from a storage unit 808, to perform various appropriate actions and processing. In the RAM 803, various programs and data required for operation of the storage device 800 can also be stored. The computing unit 801, the ROM 802, and the RAM 803 are connected to each other through a bus 804. An input/output (I/O) interface 805 is also connected to the bus 804.

Multiple components in the device 800 are connected to the I/O interface 805, including: an input unit 806, such as a keyboard, a mouse, etc.; an output unit 807, such as various types of displays, speakers, etc.; and a storage unit 808, such as a magnetic disk, an optical disc, etc.; and a communication unit 809, such as a network card, a modulator-demodulator, a wireless communication transceiver, etc. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of computing unit 801 include, but are not limited to, a central processing unit (CPU), a graphics processing unit (GPU), various dedicated artificial intelligence (AI) computing chips, various computing units that run machine learning model algorithms, and a digital signal processing (DSP), and any appropriate processor, controller, microcontroller, etc. The computing unit 801 executes the various methods and processes described above, such as an abnormal data collecting method for automatic parking. For example, in some embodiments, the abnormal data collecting method for automatic parking can be implemented as a computer software program, which is tangibly included in a machine-readable medium, such as the storage unit 808. In some embodiments, part or all of the computer program may be loaded and/or installed on the device 800 via the ROM 802 and/or the communication unit 809. When the computer program is loaded into the RAM 803 and is executed by the calculation unit 801, one or more steps of the abnormal data collecting method for automatic parking described above can be executed. Alternatively, in other embodiments, the computing unit 801 may be configured to execute the abnormal data collecting method for automatic parking in any other suitable manner (for example, by means of firmware).

Various implementations of the systems and technologies described above herein can be implemented in a digital electronic circuit system, an integrated circuit system, a field programmable gate array (FPGA), an application specific integrated circuit (ASIC), an application specific standard product (ASSP), a system on a chip system (SOC), a complex programmable logic device (CPLD), a computer hardware, a firmware, a software, and/or a combination thereof. These various implementations may include: being implemented in one or more computer programs, the one or more computer programs may be executed and/or interpreted on a programmable system including at least one programmable processor, the programmable processor can be a special-purpose or general-purpose programmable processor that can receive data and instructions from the storage system, at least one input apparatus, and at least one output apparatus, and transmit the data and instructions to the storage system, the at least one input apparatus, and the at least one output apparatus.

The program code used to implement the method of the present disclosure can be written in any combination of one or more programming languages. These program codes can be provided to a processor or a controller of a general-purpose computer, a special-purpose computer, or other programmable data processing apparatus, so that when the program codes are executed by the processor or controller, the function/operation specified in the flowcharts and/or block diagrams is implemented. The program code may be executed entirely on a machine, partly executed on the machine, partly executed on a remote machine as an independent software package, or entirely executed on the remote machine or server.

In the context of the present disclosure, a machine-readable medium may be a tangible medium that may contain or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the foregoing. More specific examples of the machine-readable storage medium would include electrical connections based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

For provision of interaction with a user, the system and the technique described herein may be implemented on a computer, and the computer has: a display device for displaying information to the user (such as a CRT (cathode ray tube) or an LCD (liquid crystal display) monitor); and a keyboard and a pointing device (such as a mouse or a trackball), the user may provide an input to the computer through the keyboard and the pointing device. Other kinds of devices may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser through which the user may interact with the implementations of the systems and the techniques described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computer system may include a client and a server. The client and the server are generally far away from each other, and generally interact with each other through the communication network. A relationship between the client and the server is generated by computer programs running on a corresponding computer and having a client-server relationship. The server can be a cloud server, also known as a cloud computing server or a cloud host. It is a host product in a cloud computing service system to solve shortcomings of traditional physical hosting and VPS services ("Virtual Private Server", or "VPS" for short), which are difficulty in management and weakness in business scalability. The server can also be a server of a distributed system, or a server combined with a block chain.

It should be understood that the various forms of processes shown above can be used, and reordering, addition, or deletion of a step can be performed. For example, the steps recorded in the present application can be executed concurrently, sequentially, or in different orders, provided that desirable results of the technical solutions disclosed in the present application could be achieved, and there is no limitation herein.

The above specific embodiments do not constitute a limitation on the protection scope of the present application. Those skilled in the art should understand that various modifications, combinations, sub-combinations, and replacements can be made according to design requirements and other factors. Any modification, equivalent replacement and improvement made within the spirit and principle of the present application shall be included in the protection scope of the present application.

What is claimed is:

1. An abnormal data collecting method for automatic parking, comprising:
    in response to monitoring that a target vehicle generates a fault code during an automatic parking process, matching, by a server, the fault code with at least one pre-configured fault code to be collected, wherein the pre-configured fault code to be collected each corresponds to an abnormality type respectively, and the abnormality type comprises: system abnormality type, abnormal operating type, and driver operation abnormal type;
    detecting whether a data collecting strategy corresponding to the fault code to be collected is consistent with a standard data collecting strategy stored in a cloud server according to a preset time interval;
    in a case that it is detected that the data collecting strategy corresponding to the fault code to be collected is inconsistent with the standard data collecting strategy, downloading the standard data collecting strategy from the cloud server, and determining the standard data collecting strategy as the data collecting strategy corresponding to the fault code to be collected;
    in response to determining that the fault code matches the fault code to be collected, determining, by the server, the data collecting strategy corresponding to the fault code to be collected; and
    performing, by the server, a data collecting operation on abnormal data corresponding to the fault code according to the data collecting strategy;
    wherein the data collecting strategy comprises a data type, a data format, and a collection duration of abnormal data to be collected.

2. The method according to claim 1, wherein the performing, by the server, a data collecting operation on abnormal data corresponding to the fault code according to the data collecting strategy comprises:
    collecting all target data that matches a collection duration among data corresponding to the fault code; and
    acquiring data matching a data type and a data format of the abnormal data to be collected among all the target data as the abnormal data corresponding to the fault code.

3. The method according to claim 2, wherein the collection duration covers a preset duration before and after occurrence of the fault code;
    the collecting all target data that matches the collection duration among data corresponding to the fault code comprises:
    acquiring first target data within the preset duration before the occurrence of the fault code from a preset memory loop tool of the target vehicle;
    acquiring second target data written into the memory loop tool in real time by the target vehicle within the preset duration after the occurrence of the fault code; and
    using the first target data and the second target data as all the target data.

4. The method according to claim 1, wherein the data collecting strategy further comprises priority information corresponding to each data type; and after the performing, by the server, a data collecting operation on abnormal data corresponding to the fault code according to the data collecting strategy, the method further comprises:
    performing a storing operation on the abnormal data according to the priority information corresponding to each data type.

5. The method according to claim 4, wherein the performing a storing operation on the abnormal data according to the priority information corresponding to each data type comprises:
    if a data type priority of the abnormal data is higher than a preset priority threshold, uploading the abnormal data to a cloud server for storage; and
    if the data type priority of the abnormal data is lower than the preset priority threshold, performing a data compression operation on the abnormal data, and adding the compressed abnormal data to a cache queue for storage.

6. The method according to claim 5, wherein the uploading the abnormal data to a cloud server for storage, comprises:
    uploading the abnormal data to the cloud server for storage by breakpoint resumption.

7. The method according to claim 1, wherein after the in response to determining that the fault code matches the fault code to be collected, determining, by the server, a data collecting strategy corresponding to the fault code to be collected, the method further comprises:
    in response to detecting that multiple fault codes matching fault codes to be collected are generated at a same time, acquiring data collecting strategies corresponding to the fault codes to be collected that match the multiple fault codes respectively;
    performing the data collecting operation on abnormal data corresponding to the multiple fault codes according to the data collecting strategies corresponding to the fault codes to be collected that match the multiple fault codes to obtain the abnormal data corresponding to the multiple fault codes;
    performing a fusing operation on the abnormal data corresponding to the multiple fault codes to obtain fused abnormal data; and modifying an identifier of the fused abnormal data to make a modified identifier of the fused abnormal data is capable of representing the multiple fault codes according to the multiple fault codes.

8. An abnormal data collecting apparatus for automatic parking, comprising:
at least one processor; and
a non-transitory computer-readable memory communicatively connected to the at least one processor; wherein, the non-transitory computer-readable memory stores instructions executable by the at least one processor, and the instructions are executed by the at least one processor, so that the at least one processor is configured to:
in response to monitoring that a target vehicle generates a fault code during an automatic parking process, match the fault code with at least one pre-configured fault code to be collected, wherein the pre-configured fault code to be collected each corresponds to an abnormality type respectively, and the abnormality type comprises: system abnormality type, abnormal operating type, and driver operation abnormal type;
in response to determining that the fault code matches the fault code to be collected, determine a data collecting strategy corresponding to the fault code to be collected; and
perform a data collecting operation on abnormal data corresponding to the fault code according to the data collecting strategy;
wherein the data collecting strategy comprises a data type, a data format, and a collection duration of abnormal data to be collected.

9. The apparatus according to claim 8, wherein the at least one processor is configured to:
collect all target data that matches a collection duration among data corresponding to the fault code; and
acquire data matching a data type and a data format of the abnormal data to be collected among all the target data as the abnormal data corresponding to the fault code.

10. The apparatus according to claim 8, wherein the collection duration covers a preset duration before and after occurrence of the fault code;
the at least one processor is configured to:
acquire first target data within the preset duration before the occurrence of the fault code from a preset memory loop tool of the target vehicle;
acquire second target data written into the memory loop tool in real time by the target vehicle within the preset duration after the occurrence of the fault code; and
use the first target data and the second target data as all the target data.

11. The apparatus according to claim 8, wherein the at least one processor is further configured to:
detect whether the data collecting strategy corresponding to the fault code to be collected is consistent with a standard data collecting strategy stored in a cloud server according to a preset time interval;
if it is detected that the data collecting strategy corresponding to the fault code to be collected is inconsistent with the standard data collecting strategy, download the standard data collecting strategy from the cloud server, and use the standard data collecting strategy as the data collecting strategy corresponding to the fault code to be collected.

12. The apparatus according to claim 8, wherein the data collecting strategy further comprises priority information corresponding to each data type; and the at least one processor is further configured to:
perform a storing operation on the abnormal data according to the priority information corresponding to each data type.

13. The apparatus according to claim 12, wherein the at least one processor is configured to:
if a data type priority of the abnormal data is higher than a preset priority threshold, upload the abnormal data to a cloud server for storage; and
if the data type priority of the abnormal data is lower than the preset priority threshold, perform a data compression operation on the abnormal data, and add the compressed abnormal data to a cache queue for storage.

14. The apparatus according to claim 13, wherein the at least one processor is configured to:
upload the abnormal data to the cloud server for storage by breakpoint resumption.

15. The apparatus according to claim 8, wherein the at least one processor is further configured to:
in response to detecting that multiple fault codes matching fault code to be collected are generated at a same time, acquire data collecting strategies corresponding to the fault codes to be collected that match the multiple fault codes respectively;
perform the data collecting operation on abnormal data corresponding to the multiple fault codes according to the data collecting strategies corresponding to the fault codes to be collected that match the multiple fault codes to obtain the abnormal data corresponding to the multiple fault codes;
perform a fusing operation on the abnormal data corresponding to the multiple fault codes to obtain fused abnormal data; and
modify an identifier of the fused abnormal data to make a modified identifier of the fused abnormal data is capable of representing the multiple fault codes according to the multiple fault codes.

16. A non-transitory computer-readable storage medium, having computer instructions stored thereon, wherein the computer instructions are used to cause a computer to:
in response to monitoring that a target vehicle generates a fault code during an automatic parking process, match the fault code with at least one pre-configured fault code to be collected, wherein the pre-configured fault code to be collected each corresponds to an abnormality type respectively, and the abnormality type comprises: system abnormality type, abnormal operating type, and driver operation abnormal type;
detect whether a data collecting strategy corresponding to the fault code to be collected is consistent with a standard data collecting strategy stored in a cloud server according to a preset time interval;
in a case that it is detected that the data collecting strategy corresponding to the fault code to be collected is inconsistent with the standard data collecting strategy, download the standard data collecting strategy from the cloud server, and determine the standard data collecting strategy as the data collecting strategy corresponding to the fault code to be collected;
in response to determining that the fault code matches the fault code to be collected, determine the data collecting strategy corresponding to the fault code to be collected; and
perform a data collecting operation on abnormal data corresponding to the fault code according to the data collecting strategy;

wherein the data collecting strategy comprises a data type, a data format, and a collection duration of abnormal data to be collected.

* * * * *